(12) United States Patent
Plasch

(10) Patent No.: US 9,770,778 B2
(45) Date of Patent: Sep. 26, 2017

(54) DEVICE FOR FEEDING A WELDING WIRE TO A WELDING DEVICE

(71) Applicant: Siegfried Plasch, Wels (AT)

(72) Inventor: Siegfried Plasch, Wels (AT)

( * ) Notice: Subject to any disclaimer, the term of this patent is extended or adjusted under 35 U.S.C. 154(b) by 183 days.

(21) Appl. No.: 14/779,311

(22) PCT Filed: Mar. 21, 2014

(86) PCT No.: PCT/EP2014/055753
§ 371 (c)(1),
(2) Date: Sep. 22, 2015

(87) PCT Pub. No.: WO2014/147245
PCT Pub. Date: Sep. 25, 2014

(65) Prior Publication Data
US 2016/0059342 A1 Mar. 3, 2016

(30) Foreign Application Priority Data
Mar. 22, 2013 (EP) .................... 13160679

(51) Int. Cl.
*B23K 9/00* (2006.01)
*B23K 9/12* (2006.01)
*B23K 9/133* (2006.01)

(52) U.S. Cl.
CPC ............ *B23K 9/125* (2013.01); *B23K 9/1336* (2013.01); *B23K 9/12* (2013.01)

(58) Field of Classification Search
CPC .......... B23K 9/12; B23K 9/121; B23K 9/124; B23K 9/125; B23K 9/133; B23K 9/1333; B23K 9/1336

USPC ........................ 219/136, 137 R, 137.2–137.7
See application file for complete search history.

(56) References Cited

U.S. PATENT DOCUMENTS

| 3,019,329 | A | * | 1/1962 | Zeller | B23K 9/12 |
| | | | | | 219/124.02 |
| 3,668,364 | A | * | 6/1972 | Nomura | B23K 9/1333 |
| | | | | | 219/125.12 |
| 3,681,564 | A | * | 8/1972 | Hiyama | B23K 9/30 |
| | | | | | 219/125.12 |
| 4,417,128 | A | * | 11/1983 | Nomura | B23K 9/0216 |
| | | | | | 219/124.34 |

FOREIGN PATENT DOCUMENTS

| AU | 774255 | 1/2002 |
| EP | 1080818 A2 | 3/2001 |
| GB | 2368319 A | 5/2002 |

* cited by examiner

*Primary Examiner* — Sang Y Paik

(57) ABSTRACT

A device for feeding a welding wire to a welding device is disclosed, having a carriage guide, having a carriage that is supported on a carriage guide so that it is able to move along a carriage axis, particularly in a linear fashion, having an advancing drive, which has an advancing device that is provided on the carriage and driven to induce an advancing motion of the welding wire, and having a carriage drive, which includes a drive unit, an eccentric that is driven by the drive unit, and an eccentric rod that is eccentrically mounted on the eccentric and is mechanically coupled to the carriage to induce a reciprocating motion to the carriage, said carriage drive having means for adjusting the stroke of the reciprocating motion of the carriage.

15 Claims, 2 Drawing Sheets

DEVICE FOR FEEDING A WELDING WIRE TO A WELDING DEVICE

FIELD OF THE INVENTION

The invention relates to a device for feeding a welding wire to a welding device, having a carriage guide, having a carriage that is supported on a carriage guide so that it is able to move along a carriage axis, particularly in a linear fashion, having an advancing drive, which has an advancing device that is provided on the carriage and driven to induce an advancing motion of the welding wire, and having a carriage drive, which includes a drive unit, an eccentric that is driven by the drive unit, and an eccentric rod that is eccentrically mounted on the eccentric and is mechanically coupled to the carriage to induce a reciprocating motion to the carriage, said earn age drive having means for adjusting the stroke of the reciprocating motion of the carriage.

BACKGROUND OF THE INVENTION

In order to be able to adjust the (peak-to-peak) stroke of a reciprocating motion or oscillating stroke motion of a welding wire, a device equipped with a carriage drive is known from the prior art, (EP1080818A2) in which it is possible to change the eccentricity of its eccentric. To this end, the eccentric rod must be manually changed from one bearing point on the eccentric to another bearing point on the eccentric. The ability to change positions of the bearing point on the eccentric disadvantageously requires a comparatively high design cost if the eccentric must be able to relay high speeds of the drive unit and as a result, comparatively powerful mechanical stresses act on the eccentric and the eccentric rod.

SUMMARY OF THE INVENTION

The object of the invention, therefore, is to embody a device, which is for supplying a welding wire that is moving in reciprocating fashion, in a simply designed and thus inexpensive way such that a high-frequency reciprocating motion of the welding wire is made possible even with a continuous stroke adjustment.

The invention attains the stated object in that the carriage drive, as a means for adjusting the stroke of the reciprocating carriage motion, has a guide that supports at least the eccentric in an adjustable fashion on a guidance axis that extends at an angle relative to the carriage axis of the carriage guide.

If the carriage drive, as a means for adjusting the stroke of the reciprocating carriage motion, has a guide that supports at least the eccentric in an adjustable fashion on a guidance as that extends at an angle relative to the carriage axis of the carriage guide, then it is possible in a simply designed and therefore inexpensive way to achieve a smooth adjustability of the stroke of the reciprocating motion of the welding wire. In addition, this smooth adjustability also requires no design changes with regard to the eccentricity of the eccentric. It is thus possible to leave the design untouched, even in the subregions of the advancing drive that are subjected to comparatively high mechanical stresses for producing a reciprocating carriage motion. By using the guidance adjustment of the eccentric, it is then possible for a fixed bearing point of the eccentric rod on the eccentric to suffice, thus making it possible to ensure an extremely resilient coupling of the carriage to the eccentric rod. It is therefore possible, despite the continuous stroke adjustment, to enable a high-frequency reciprocating motion of the welding wire. For example, it is thus possible to enable a frequency range of from 5 to 40 Hertz with a stroke of from 2 to 10 millimeters. In addition, a position adjustment of the eccentric relative to the carriage axis is comparatively simple to implement, which further improves the ease of operation of the device.

If the guidance of the drive unit and eccentric is adjustably supported on a guidance axis that extends at an angle relative to the carriage axis of the carriage guide, then it is possible to simplify the design complexity of the driven interconnection between the drive unit and the eccentric. This also makes it possible to eliminate design-related restrictions to the freedom of movement of the eccentric relative to the drive. Among other things, this can be used to increase the variability in the adjustable stroke of the reciprocating motion of the carriage.

The design of the device can be further simplified if the drive unit and eccentric constitute a combined subassembly. In addition, this subassembly can provide for a comparatively high torsional rigidity in order to steadily produce high-frequency reciprocating motions of the carriage.

If the guidance axis of the linear guide extends perpendicular to the carriage axis of the carriage guide, then it is possible to make use of advantages with regard to a low design complexity and inexpensive production of a linear guide.

If the drive unit has a motor, in particular an electric motor, and a motor-connected belt transmission whose belt is connected to the eccentric, then it is possible to significantly increase the steadiness of the device. The belt transmission can specifically provide for a mechanical relief of the motor relative to impact loads acting on the eccentric.

A comparatively high rigidity in the drive train can be achieved if the belt is embodied in the form of a toothed belt that engages with the teeth of the eccentric.

In order to be able to maintain the home position of the carriage on the carriage guide despite the position adjustment of the eccentric, it is possible for the eccentric rod to be embodied as adjustable in its length.

If the device has a base to which the carriage guide and the guide are fastened, then the carriage drive can be mechanically supported by the base for the carriage guide, which can provide for a comparatively high degree of smooth running of the carriage drive, even with a high-frequency reciprocating motion.

If the device has a base and the advancing drive has a motor that is mounted to the base and is drive-connected, to the advancing device provided on the carriage, then the weight load of the carriage can be reduced and the mechanical stresses on the carriage drive can be consequently reduced as well. This makes it possible to achieve design simplifications in the carriage drive. In addition, the steadiness of the advancing drive can be increased relative to the mechanical stresses of a high-frequency reciprocating motion.

The motor of the advancing drive can be decoupled from mechanical oscillations in the drive train if the motor is drive-connected to the advancing device via a transmission, in particular via a belt transmission.

If the transmission is equipped with an idler pulley, then it is possible to compensate for an undesirable tension in the drive train of the advancing, drive, which can be produced by a shifting of the carriage on the carriage guide. It is thus possible to reduce the risk of transmission damage and to increase the steadiness of the device.

Design simplifications in the advancing drive can be achieved if the transmission is equipped with a toothed belt.

It is possible to achieve a precise and reproducibly constant advancing motion if the advancing device has at least one pair of driven drive pulleys between which the welding wire is guided in its advancing motion.

BRIEF DESCRIPTION OF THE DRAWINGS

By way of example, an exemplary embodiment of the subject of the invention is shown in greater detail in the drawings.

DETAILED DESCRIPTION OF TILE PREFERRED EMBODIMENTS

Figure 1:
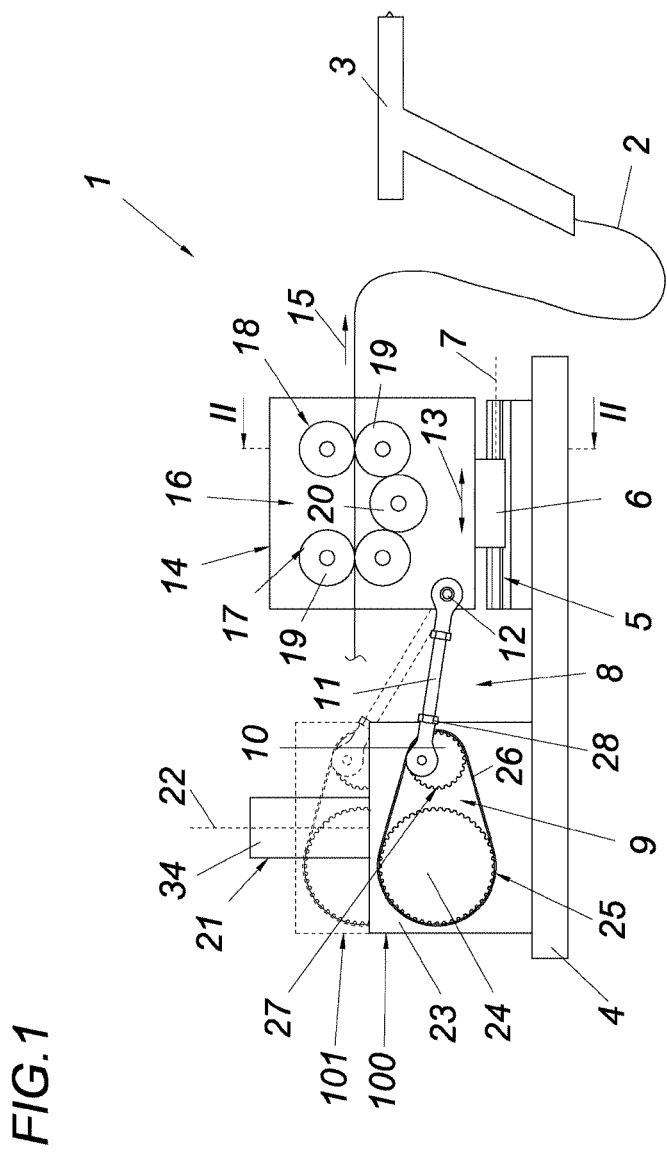
FIG. 1 shows a simplified side view of the device according to the invention and FIG. 2 shows a partial cut-away view along the line II-II from FIG. 1.

The device 1 shown in FIG. 1 fulfills the purpose of supplying a welding wire 2 to a welding device 3. To this end, the device 1 has a base 4, which serves as a foundation for the device 1. A carriage guide 5 is fastened to this base 4. This carriage guide 5 supports a carriage 6 in moving fashion along a carriage axis 7. The carriage 6 is moved with the aid of a carriage drive 8. For this purpose, the carriage drive 8 is associated with a drive unit 9, an eccentric 10 that is driven by the drive unit 9, and an eccentric rod 11 that is supported on the eccentric in eccentric fashion and is mechanically coupled to the carriage 4 by means of a bearing 12. When the eccentric 10 rotates, the carriage 6 is forced to execute a reciprocating motion 13. This reciprocating carriage motion 13 is transmitted to welding wire 3, which is forced to execute a continuous advancing motion 15 by an advancing drive 14. As a result, the advancing motion 15 of the welding wire 3 can be overlaid with a reciprocating motion 13. The advancing device 16 of the advancing drive 14 is provided on the carriage 6 and has two pairs 17, 18 of driven drive pulleys 19, which clamp and guide the welding wire 2 between themselves to produce its advancing motion 15. The rotation speed of the driving gear 20, which meshes with the drive pulley 19, can be used to adjust the advancing of the welding wire 3.

It is also possible to adjust the stroke of the reciprocating carriage motion 13 (the stroke being a measure for the magnitude of the deflection from the lowest value of a periodic process to its highest value). According to the invention, this is achieved through measures provided on the carriage drive 8 in that the latter is associated with a guide 21 as a means for achieving this. With the aid of this guide 21, the eccentric 10 is supported on a guidance axis 22 that extends at an angle relative to the carriage axis 7 of the carriage guide 5; this angle is perpendicular in the exemplary embodiment. It is thus possible for the eccentricity that is predetermined by the eccentric 10 to be transmitted to the carriage 6 via the eccentric rod 11 with a different effect, thus altering the stroke of the reciprocating carriage motion 13 without having to modify the eccentric drive, as is apparent by comparing the home position 100 of the carriage drive 8, which is depicted with solid lines FIG. 1, to the adjusted position 101 of the carriage drive 8, which is depicted with dashed lines. Expensive measures in the region of the highest mechanical stresses can therefore be eliminated while nevertheless achieving a high degree of steadiness of the device 1, even with a high-frequency reciprocating carriage motion 13.

As is also clear from FIG. 1, the drive unit 9 and eccentric 10 are combined into a subassembly 23, allowing the guide 21 to be supported together with the drive unit 9 and eccentric 10 in an adjustable fashion on a guidance axis 22 that extends at an angle relative to the carriage axis 7 of the carriage guide 5. This makes it possible to change the position of a subassembly 23 in a simple way. For the sake of particularly simple design conditions with regard to the guide 21, according to FIG. 1, the linear guidance axis 22 of the guide extends perpendicular to the carriage axis 7 of the carriage guide 5.

In order to keep shocks or impact stresses away from the electric motor 24 of the drive unit 9 or in order to reduce them, a belt transmission 25 is provided, which drive-connects the motor 24 to the eccentric 10 via a toothed belt 26. In a simply designed embodiment, the eccentric in turn is provided with teeth 27 for this purpose, which are engaged by the toothed belt 26.

The eccentric rod 11 is embodied so that it can be adjusted in its length by means of nuts 28. It is thus possible to correct a shifting of the home position of the carriage 6 on the carriage guide 5, which shifting can occur with a slight change in the position of the carriage drive 8.

Figure 2:
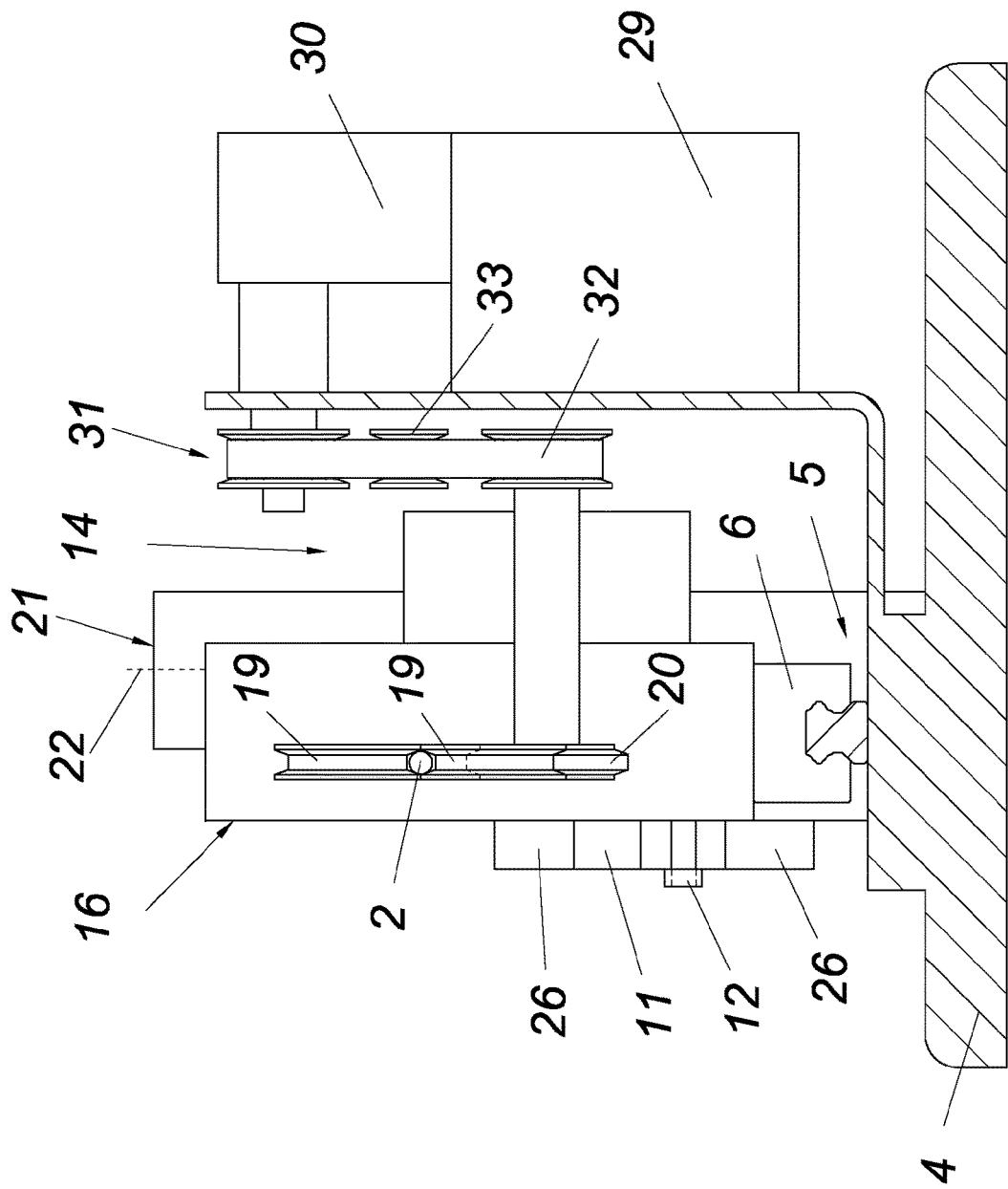

As is clear from FIGS. 1 and 2, the guide 21 is fastened to the base 4 so that the carriage drive 8 and carriage guide 5 can be reciprocally supported via the base 4.

FIG. 2 shows the drive train of the advancing drive 14 in greater detail. According to the invention, the advancing drive 14 has less strict design requirements with regard to the carriage 6. This is due, among other things, to the fact that the motor 29 of the advancing drive 14 is fastened to the base 4, which additionally relieves stress on the carriage 6. This yields the further result of relieving stress on the mechanics of the carriage drive 8. The device 1 according to the invention can therefore reliably withstand a high-frequency reciprocating motion 13.

The motor 29 is connected to a transmission 31 embodied in the form of a belt transmission, which drives the driving gear 20 of the advancing device 16 provided on the carriage 6 in order to thus produce an advancing motion of the welding wire 2.

The transmission 31 is likewise equipped with a toothed belt 32. In addition, the transmission 31 is associated with an idler pulley 33 in order to be able to compensate for the changes in distance between the motor 29 and the reciprocating carriage 6.

As shown in FIG. 1, the linear guide 21 has a guide rail 34 as a guide element, on which the subassembly 23 is adjustably guided.

The invention claimed is:

1. A device for feeding a welding wire to a welding device, the device for feeding a welding wire comprising:
a carriage that is supported on a carriage guide so that the carriage is able to move along a carriage axis;
an advancing drive, which has an advancing device that is provided on the carriage and driven to induce an advancing motion of the welding wire; and
a carriage drive, which includes a drive unit, an eccentric that is driven by the drive unit, and an eccentric rod that is eccentrically mounted on the eccentric and is mechanically coupled to the carriage to induce a reciprocating motion to the carriage,
wherein the carriage drive has a guide that supports at least the eccentric in an adjustable fashion on a guidance axis that extends at an angle relative to the carriage axis of the carriage guide in order to adjust a stroke of the reciprocating carriage motion.

2. The device according to claim 1, wherein the guide adjustably supports the drive unit and the eccentric on a guidance axis that extends at an angle relative to the carriage axis of the carriage guide.

3. The device according to claim 2, wherein the drive unit and eccentric constitute a subassembly.

4. The device according to claim 1, wherein the guide is a linear guide, and the guidance axis of the linear guide extends perpendicular to the carriage axis of the carriage guide.

5. The device according to claim 1, wherein the drive unit has a motor and a belt transmission connected to the motor, and the belt transmission has a belt that is connected to the eccentric.

6. The device according to claim 5, wherein the belt is a toothed belt that engages with teeth of the eccentric.

7. The device according to claim 1, wherein the eccentric rod is adjustable in its length.

8. The device according to claim 1, wherein the device has a base to which the carriage guide and the guide are fastened.

9. The device according to claim 1, wherein the device has a base and the advancing drive has a motor fastened to the base, which is drive-connected to the advancing device provided on the carriage.

10. The device according to claim 9, wherein the motor is drive-connected to the advancing device via a transmission.

11. The device according to claim 10, wherein the transmission is equipped with an idler pulley.

12. The device according to claim 10, wherein the transmission is equipped with a toothed belt.

13. The device according to claim 1, wherein the advancing, device has at least one pair of driven drive pulleys between which the welding wire is guided in its advancing motion.

14. The device according to claim 1, wherein the carriage is able to move along a carriage axis in a linear fashion.

15. The device according to claim 10, wherein the transmission is a belt transmission.

* * * * *